United States Patent

[11] 3,583,795

[72] Inventor Helmut A. Heine
    Herrsching Upper Bavaria, Germany
[21] Appl No 832,883
[22] Filed June 10, 1969
[45] Patented June 8, 1971
[73] Assignees Optotechnik G.m.b.H.;
    Propper Manufacturing Company, Inc.
[32] Priority July 17, 1968
[33] Germany
[31] P 17 72 893.7

[54] OPTICAL SYSTEMS FOR OPHTHALMOSCOPES
    14 Claims, 4 Drawing Figs.
[52] U.S. Cl................................................. 351/16,
                                                                350/96
[51] Int. Cl............................................... A61b 3/12,
                                                                G02b 5/16
[50] Field of Search.......................................... 351/1, 6,
                                          11, 12, 13, 14, 16; 350/96 B

[56] References Cited
    UNITED STATES PATENTS
1,751,584   3/1930   Hansell.......................... 350/96 BX
1,806,318   5/1931   Tillyer........................... 351/11X
1,889,456  11/1932   Tillyer........................... 351/6
2,992,587   7/1961   Hicks, Jr. et al.................. 350/96 B
3,315,680   4/1967   Silbertrust et al................. 351/6UX Primary Examiner—David Schonberg
Assistant Examiner—Paul A Sacher
Attorney—Blum, Moscovitz, Friedman and Kaplan ABSTRACT: An ophthalmoscope for directing light to an eye which is to be examined. The ophthalmoscope has a reflector which receives light which travels along an optical axis of the ophthalmoscope and reflects the light to the eye which is to be examined. Along this optical axis is located a light source for directing light therealong to the reflector, and this light source takes the form of an elongated light-conducting rod. This rod has directed toward the reflector a light-discharge end which preferably is of rectangular configuration, and distant from the reflector the light-conducting rod has a light-receiving end for receiving light from any source, such as a lamp or light-conducting cable. This light-receiving end of the rod is of an area greater than the light-discharge end, and the rod can gradually taper from its light-receiving end to its light-discharge end. The light-receiving end of the rod is preferably of a circular configuration.

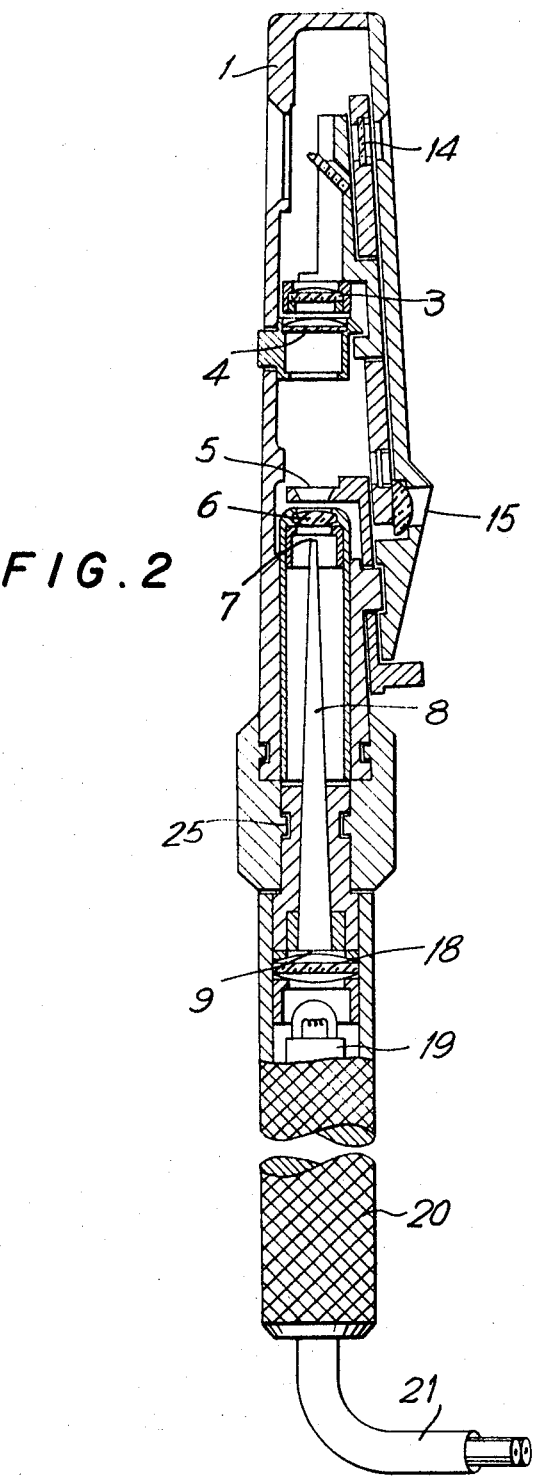
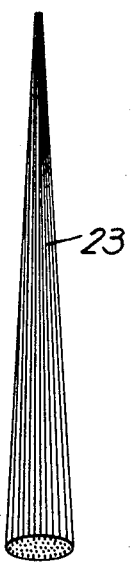
FIG.2
FIG.3
INVENTOR.
HELMUT A. HEINE

OPTICAL SYSTEMS FOR OPHTHALMOSCOPES

BACKGROUND OF THE INVENTION

The present invention relates to ophthalmoscopes.

Thus, the present invention relates to an optical instrument which is used for observing and examining the background area of the eye of a human being.

Since the invention of the eye reflector by H. Von Helmholtz, there have been numerous constructions for devices of this general type. While the Helmholtz eye reflector requires a light source situated externally of and beyond the reflector itself, it has already been proposed to construct ophthalmoscopes with built-in internal light sources. Up to the present time such internal light sources have exclusively taken the form of electric filament lamps.

With hand-held ophthalmoscopes which must be maintained stationary by the hand of the examining physician instead of being mounted on an absolutely stationary support, the use of such filament lamps as a light source creates certain difficulties. The light source must have an exterior surface which is as small as possible while at the same time the useful stream of light must be as great as possible, so that a high light density is essential. With small dimensions for the light source it becomes essential, in order to be able to carry out the opthalmoscope examination without a widened pupil at the eye of the patient, to be able to direct sufficient light through the pupil of the eye of the patient onto the background of the eye. When, for example, the optical construction of the ophthalmoscope, as in the case of many known constructions, is chosen in such a way that the light source is imaged approximately at the pupil of the patient, then this image should be as small as possible so that as much of the entire available stream of light can be used while at the same time a sufficiently great part of the pupil of the patient, through which the light does not pass, remains available for observation purposes.

When using a filament lamp as a light source, it is not possible to increase very readily the light density of the filament coil, since when the temperature of the glowing filament becomes too high, the filament melts and becomes interrupted so as to terminate the operations. The use of filament lamps of high output also creates difficulties with a hand-held ophthalmoscope, since an increase in the power consumption of the lamp results also in an unavoidable increase in the heating of the entire instrument and even where small fans are built into the instrument to cool the latter, as has already been proposed, it becomes possible to utilize in a practical manner within reasonable costs the power consumed by the lamp only up to a given upper limit.

SUMMARY OF THE INVENTION

It is a primary object of the invention to create an ophthalmoscope which will avoid the above drawbacks.

Particular, it is an object of the present invention to provide an ophthalmoscope which is capable of utilizing a light source of small dimensions and high light density to achieve a high degree of illumination at the background of the patient's eye.

In addition it is an object of the invention to provide a construction of this type which is capable of maintaining the cross section of the stream of light at the location of the pupil of the patient so small that an unhindered observation of the illuminated part of the background of the eye becomes possible.

The use of filament lamps of high output built into an ophthalmoscope creates difficulties for the reasons pointed out above. It is known from other medical and technical investigating instruments to make use of a light source of high output situated at the exterior of the investigating instrument itself and to conduct the light along a light-conducting cable to the interior of the investigating instrument. The light-conducting cables may consist, for example, of a large number of individual light-conducting fibers or filaments. These light-conducting filaments or fibers have a core of optically high refractive material and a thin outer casing of low refractive material. The total reflection at the limiting surface between the high and low refracting materials serves to transmit the light which impinges on the ends of the fibers or filaments with relatively low losses to the other end of the cable. Such light-conducting cables are known, for example, in endoscopes of the most widely varying types used for medical purposes.

Also, light sources which in general image the filament coil at the light-receiving end of the bundle of fibers are suitable and well known. In the case of endoscopes and the like, it is only possible to achieve a general illumination of the object to be observed of as great a brightness as possible, without the presence of any special requirements of any other type in the properties of the illuminating system. With the present invention, however, it is also possible to use an external light source, with the light thereof conducted through a light-conducting cable to the ophthalmoscope, but with the light treated in the interior of the instrument in a very special way in accordance with the present invention.

Thus, it is an object of the present invention to provide an ophthalmoscope which is capable of receiving light from an exterior source while at the same time being able to treat the received light in such a way that it will have the best possible properties for the purpose of the opthalmoscope.

With the present invention the cross section of the stream of light is changed in such a way that the surface of the light-receiving body of the invention which received the light has an area greater than a light-discharge surface from which the light travels to a reflector of the ophthalmoscope. This latter light-discharge surface forms a secondary light source from which light is directed along the optical axis of the instrument to the reflector thereof.

It thus becomes possible with the structure of the invention to fulfill the requirements of the ophthalmoscope without encountering the disadvantages inherent in the known use of filament lamps.

A further requirement for the light source of an ophthalmoscope resides in the fact that it must be possible to achieve the smallest possible angle between the illuminating and observation rays so that the surface of the background of the eye is illuminated by the ophthalmoscope is capable of being readily observed.

This latter requirement results in a construction where the illuminating bundle of light rays are reflected through an angle of 90° by the upper edge of a reflector or prism used for reflecting the light through an angle of 90°. Over this edge of the reflector it becomes possible to direct the observation rays along which the examining physician can observe the background of the eye through the instrument. The use of the filament of a lamp directly in the ophthalmoscope thus carries with it the requirement that the lamp or its filament be adjusted in such a way that the bundle of illuminating rays be reflected accurately by the upper edge of the mirror or prism which forms the reflector. Since filament lamps must be frequently changed, considerable expenses are incurred in order to reliably maintain the instrument in the condition where at all times there is a sufficient accuracy in the adjustment of the filament with respect to the remainder of the illuminating system.

These difficulties are completely avoided with the present invention. Moreover, the advantages of the invention are achieved irrespective of whether the external light source is one which makes use of a light-conducting cable or whether the light-receiving end of a light-conducting rod of the invention is illuminated by a lamp either directly or with the location of a condenser between the light-conducting rod and a lamp which is built into the ophthalmoscope.

When using a lamp which is situated directly in the ophthalmoscope itself, for the purpose of illuminating the light-receiving end of the elongated light-conducting rod of the invention, it is also only possible, as with the known constructions, to use a lamp of only up to a certain limiting output, so as to void excessive heating of the instrument. However, the optical quality and the requirement of adjustment of the lamp becomes for less troublesome than in the case where a direct imaging of the lamp filament takes place through the illuminating system of the ophthalmoscope. Thus, even where a lamp is built directly into the ophthalmoscope of the invention there is still an extremely accurate adjustment of the light-discharge end of the light-conducting rod which forms the secondary light source of the illuminating system of the invention. It is this light-discharge end of the light-conducting rod of the invention which becomes imaged by the illuminating system. Thus, for these reasons it is also of considerable advantage to use in the ophthalmoscope an internal lamp which illuminates the light-receiving end of the light-conducting rod, since even with such a construction there is a considerable advantage as contrasted with previously known constructions where a direct imaging of the lamp filament was required. Precise adjustment of the light-discharge surface is readily possible, and the filament lamp which is required can be of a far less expensive construction than conventional lamps used in such combinations so that the structure of the invention is far less costly.

Thus, according to the invention it is possible to provide interchangeably either an external light source with a light-conducting cable for illuminating the light-receiving end of the light-conducting rod, or instead it is possible to situate in the region of the light-receiving end of this rod a lamp which is situated directly in the ophthalmoscope to illuminate the light-conducting rod of the invention.

Thus, it is an object of the present invention to provide a construction which makes it possible to selectively use either an external or an internal source of light, and this feature is of great advantage in the case where the ophthalmoscope is to be used on the one hand, for example, in the practice of a physician, where relatively large and heavy external light sources are in any event present without requiring additional space, while on the other hand the very same ophthalmoscope can also be used for examinations at the bed of a patient, so that it can be readily rendered portable, in situations where extremely great inconvenience is encountered if it is required to transport also a relatively heavy light projector, often under conditions where the use of such structures is virtually impossible. In such cases the light-conducting cable can be replaced by the internal light source which itself can be supplied with power either from a source within the instrument or from an outside source of current.

In light-counducting rods there are certain unavoidable light losses. Even when such light losses are relatively small, they nevertheless are noticable in the case where the power consumed by the lamp would serve to illuminate the light-receiving end of the light-conducting rod must be maintained extremely low, because, for example, it is required that this lamp be operated by batteries conveniently situated in a small handgrip of the instrument. For such a case the invention provides for complete replacement of the light-conducting rod with a lamp whose filament is situated at that location where the light-discharge surface of the light-conducting rod was initially located. Thus, it is possible to convert the ophthalmoscope of the invention to a construction corresponding to previously known constructions where the filament of the lamp is directly imaged by the optical system of the ophthalmoscope. This possibility of utilizing the very same instrument selectively either with an external light source of high output or with an internal light source of average output which illuminates the light-receiving end of the light-conducting rod, or finally with an internal lamp of relatively small output, whose filament is directly imaged, makes it possible to increase greatly the value of the structure of the invention since in this way it has a practically universal utility.

Thus, it is yet another object of the present invention to provide a construction according to which it becomes possible to interchangeably use in one and the same ophthalmoscope either an external light source or an internal light source coacting with an elongated light-conducting rod or to replace the latter rod with a conventional light source whose filament is directly imaged by the optical system of the ophthalmoscope.

The illuminating systems of hand ophthalmoscopes include, as is known, a light source, a condenser, an aperture as well as an illuminating objective which images this aperture sharply at the background of the eye of the patient. The condenser and imaging objective must be constructed in such a way that the imaging of the light source takes place at a suitable location. Such a suitable location for the imaging of the light source can either be considered the imaging objective, since in this case the best conditions for uniform illumination of the illuminated field are present, while the second suitable location for the imaging is the edge of the mirror or prism, since in this way it is possible to achieve a smaller parallactic angle between the observing and illuminating rays. The third suitable location for the imaging is at the pupil of the patient, since in this way it is possible to achieve the greatest light intensity at the background of the eye and the disadvantage of light reflection from the outer surface of the cornea of the patient's eye is maintained at a minimum.

Thus it has proved to be of advantage to locate the image of the light source at the upper edge of the reflector or approximately between the edge of the reflector and the eye of the patient, since in this way there is an optimum compromise between the different requirements.

A further requirement of the illuminating system of the ophthalmoscope is that the image of the light source be as small as possible because of the size of the illuminated field at the background of the eye should be as large as possible in order to assure a good observation of the background of the eye during examination.

Finally, it is also desirable to be able to use the ophthalmoscope examining in focal light the forward region of the eye where the cornea, the front chamber and the lens are located. For this purpose it must be possible to be able to adjust the location of the imaging of the illuminating field aperture selectively at an extremely small distance so that a sharp image of a suitable aperture, for example, an elongated slot or gap, is assured at the transparent medium of the front region of the eye. In order to fulfill all of these requirements the dimensions of the optical elements of the illuminating system must be very carefully selected so that they will be particularly adapted to the requirements of the illuminating system of the ophthalmoscope.

It is thus still another object of the invention to provide an ophthalmoscope with particular dimensions at its various components in order to satisfy these requirements.

According to the invention the ophthalmoscope includes in addition to the reflector means which reflects the light from the optical axis of the ophthalmoscope to the eye which is to be observed a light-conducting rod which has directed toward the reflector means a light-discharge surface of rectangular configuration and distant from the reflector means a light-receiving end surface of circular configuration. The area of the light-receiving end of the light-conducting rod of the invention is larger than the area of the light-discharge end thereof, and this elongated rod of the invention preferably tapers from its large light-receiving end to its small light-discharge end.

BRIEF DESCRIPTION OF DRAWINGS

The invention is illustrated by way of example in the accompanying drawings which form part of this application and in which:

FIG. 2 is a fragmentary partly sectional elevation of another embodiment of an ophthalmoscope of the invention;

FIG. 3 is a perspective illustration of an embodiment of a light-conducting rod of the invention.

DESCRIPTION OF PREFERRED EMBODIMENTS

Figure 1:
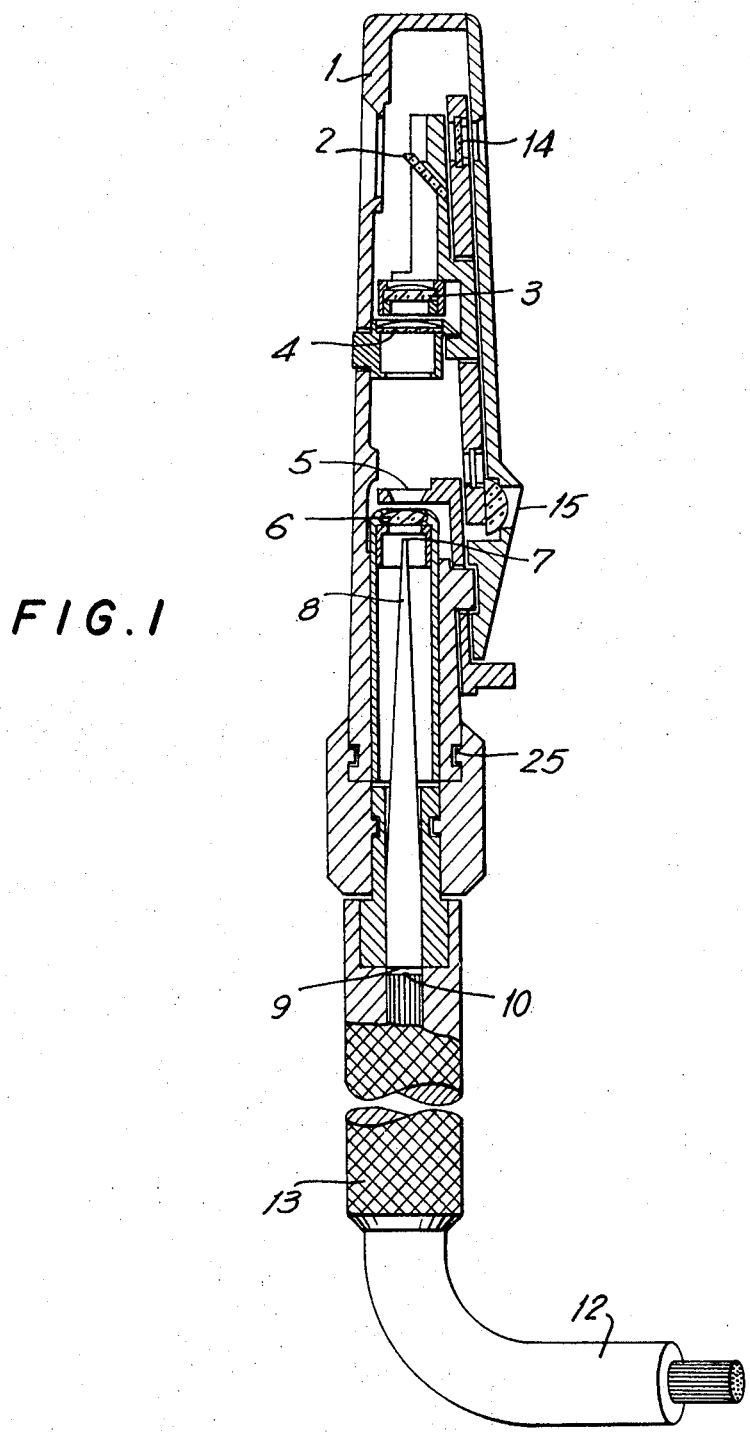
FIG. 1 is a fragmentary partly sectional elevation of one embodiment of an opthalmoscope of the invention.

Referring now to FIG. 1, the embodiment of the invention which is illustrated therein includes a housing 1 which serves to house the optical structure of the ophthalmoscope. This structure includes a reflecting means 2 for reflecting light which travels upwardly along the optical axis through approximately 90° toward the eye which is to be observed. Thus, for this purpose in the illustrated example the reflecting means takes the form of a reflector 2 provided with a suitable reflective coating at its upper surface.

Situated along the vertical optical axis beneath the reflector means 2 is an aperture 5 in the form of a suitable plate formed with an opening of a predetermined diameter, and this aperture or diaphragm 5 is imaged at infinity by the illuminating objective means 3. In this way there will be a sharp imaging of the diaphragm at the background of an emmetropic eye of a patient. The additional lens 4 situated along the optical axis in advance of the objective 3, on the side of the latter opposite from the reflector 2, serves to shorten the focal length of the imaging objective in such a way that the image of the aperture 5 can be achieved in a suitably short distance from the ophthalmoscope. Several illuminating field apertures 5 can be provided in order to take into account special conditions in the examination of the background of the eye or in the examination of a front eye region.

Situated beneath the diaphragm 5 is a light-conducting rod 8 of the invention. This rod 8 terminates in an upper light-discharge end 7 from which the light discharges to travel along the optical axis to the reflector 2. Situated ahead of the surface 7 between the latter and the aperture 5 is a condenser 6 which together with the objective 3 achieves a sharp imaging of light source, or in other words of the surface 7, at the upper edge of the reflector 2 or at a predetermined location between the upper edge of the reflector 2 and the eye of the patient.

Distant from its upper light-discharge end 7, the light-conducting rod 8 is provided with a light-receiving end surface 9 which is situated in alignment with and adjacent to a light-discharging surface 10 of a light-conducting cable 12. This light-conducting cable 12 is connected at its opposite end to an unillustrated light projector of well-known construction in such a way that as large a fraction as possible of the light of a lamp used in the light projector is projected onto the light-receiving end surface of the light-conducting cable 12.

For convenient handling of the ophthalmoscope, a grip 13 is provided. In the illustrated example, this handgrip also serves to carry the light-conducting rod 8 which serves to change the cross section of the light stream. At its upper end this grip 13 has a construction enabling it to be releasably connected with a connecting member 25 of the ophthalmoscope, rotatably connected, for example, to the bottom end of the housing 1. For example, this connecting element 25 may take the form of a bayonet connection or a threaded connection provided through the rotary connector 25 and the part of the grip 13 which houses and carries the lower portion of the rod 8.

The ophthalmoscope is provided in a known way with a lens wheel having lenses of suitable refractive powers, respectively. With such a construction it is possible to situate the required lens 14 in front of the observation window of the ophthalmoscope. The physician will look through this window over the upper edge of the reflector 2 into the eye of the patient to observe the background of the eye. The particular value of a given lens 14 which is situated in the observation aperture may be read at a window 15 which in a known way enables the value of the lens 14 to be indicated. The corresponding value graduations are situated along the periphery of the lens wheel.

Referring now to FIG. 2, the ophthalmoscope illustrated therein differs from the of FIG. 1 in that the handgrip 13 has been removed and replaced by a handgrip 20 which carries the light-conducting rod 8 and which may be connected in the very same way as the grip 13 to the ophthalmoscope through the connecting unit 25. In this embodiment the larger end 9 of the light-conducting rod 8 does not receive light from a light-conducting cable which in turn is illuminated from an exterior light source. Instead with the construction of FIG. 2 the hollow grip 20 carries in its interior a lamp 19 whose light is directed through the additional condenser 18 to the light-receiving surface 9, so that in this way the condenser 18 serves to concentrate the light at the light-receiving surface 9. The supply of current to the lamp 19 takes place through a conducting cable 21 which may be connected with any source of current.

The releasable connector 25 by which the ophthalmoscope is connected with the grip 20 is constructed in such a way as to selectively be connected with the hollow grip 20 which has the internal lamp 19 and which is connected with a source of current by the cable 21, or the very same connector 25 may be used to connected the grip 13 to the ophthalmoscope so that the light-conducting cable is used. In this way the structure of the invention may be used under widely different conditions in widely different manners.

Thus, the same ophthalmoscope head assembly may be used either with a grip carrying its own light source or with a grip carrying a light-conducting cable illuminated from an exterior light source. It is also possible to use instead of the grip 20 an unillustrated hollow grip which accommodates in its interior batteries for supplying current for the lamp 19. Conventional dry batteries as well as chargeable accumulators may be used for this purpose.

The light-conductive rod 8 of the invention, which in all embodiments of the invention is constructed to change the cross section of the stream of light, preferably is tapered as illustrated and has at its larger light-receiving end 9 a circular configuration. On the other hand, while the light-discharge end 7 may also have a circular configuration, it is preferred to provide it with a square or rectangular configuration. According to a special embodiment of the invention, the light-discharge surface is of a rectangular configuration. This latter configuration of the end 7 is such that the longer side of the rectangle extends parallel to the upper edge of the reflector 2 or the corresponding edge of a reflector in the form of a prism. In this way the image of the light-discharge surface 7 achieved by way of the condenser 6 and illuminating objective 3 along the edge of the reflector 2 takes the form of only a small narrow strip requiring only a relatively small part of the reflector directly beneath the top edge thereof in order to reflect the light in the required manner. As a result the parallactic angle between the direction of observation and the direction of illumination is maintained as small as possible.

The light-conducting rod 8 of the invention can be constructed in a number of different ways. According to one embodiment this structure for changing the cross section of the stream of light takes the form of a light conducting rod which includes a relatively massive inner core of a suitable glass having the highest possible refractive index. This inner core is surrounded by an extremely thin exterior casing of glass or plastic having a low refractive index. Of course, the end surfaces 7 and 9 of the core are exposed.

According to a second embodiment of the light-conducting rod 8 of the invention, instead of providing an exterior surrounding casing of a glass of a low refractive index, it is possible to make the casing of a multiple-layered interference material as is known in the case of interference reflectors. Such an embodiment can be of advantage particularly in the case of a light-discharge end 7 of rectangular configuration, since with such an construction the manufacture of an exterior casing of a glass of low refractive index is difficult to carry out.

Furthermore, instead of utilizing a multiple-layered interference covering it is also possible to use a material of high reflecting characteristic. For example, aluminum may be vapor deposited on the exterior surface of the inner core, except at the ends 7 and 9 thereof. Such a surrounding layer extends along the entire exterior side surface of the light-conducting rod leaving only the light entrance end and the light discharge end free of this covering material. Such a metallic reflecting exterior casing provides the light-conducting rod with a larger numerical aperture than, for example, a rod with an exterior casing of a glass or plastic of low refractive index.

Yet another embodiment of the light-conducting rod is shown in FIG. 3. In this case the light-conducting rod is made up of a correspondingly large number of light-conducting filaments or fibers 23 which is themselves are known. The diameter of each individual element 23 becomes gradually smaller from the entrance to the discharge end to the same degree as the cross section of the entire rod. Structures of this type for changing the cross section of the stream of light are known for entirely different purposes, but could not previously be used in the device of the invention. In this case, also it is possible to construct the light-discharge surface either with a circular configuration or with a rectangular configuration.

Figure 4:
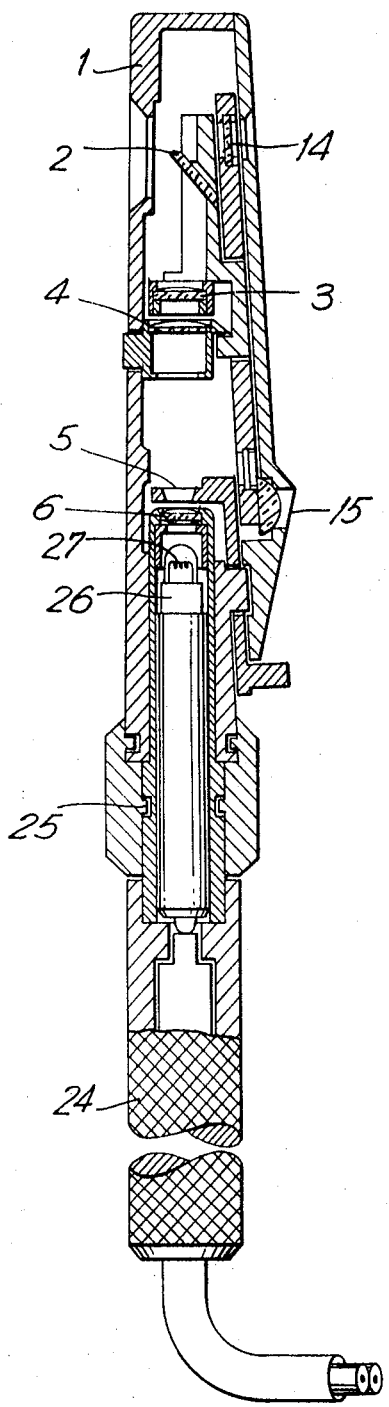
FIG. 4 is a fragmentary partly sectional elevation of yet another construction to which the ophthalmoscopes of FIGS. 1 and 2 may be converted.

Finally, FIG. 4 illustrates a possibility of using the ophthalmoscope of the invention with a conventional light source. With this embodiment the unchanged head of the ophthalmoscope is releasably connected with a grip 24 which carries at the location of the light-conducting rod a lamp 26, the filament 27 of which is accurately situated at that location where the light-discharge end of the light-conducting rod 8 is located when either of the hand-grips 13 or 20 is used. Thus, the releasable connecting unit 25 is constructed in such a way that it is possible to selectively connect to the head of the ophthalmoscope either the grip 13 with the light-conducting cable 12 and the light-conducting rod 8, or the grip 20 with the lamp 19 as well as with the light-conducting rod 8 and the current-supplying cable 21, or finally the grip 24 which carries the lamp 26 in the manner illustrated in FIG. 4.

Thus, FIG. 4 demonstrates that it is possible to convert the structure of the invention whenever required to a construction which is provided with conventional illumination. With the embodiment of FIG. 4 it is possible to use instead of the grip 24 which is connected through an electrical conductor with a source of current a hollow grip capable of accommodating batteries for operating the lamp 26. Such a grip can be provided with a variable resistor which can be adjusted in order to control the light intensity of the lamp 26.

Thus, FIGS. 1, 2 and 4 show various embodiments of the invention according to which it is possible selectively to operate with a light-conducting rod which changes the cross section of the light stream and which may have light supplied from the exterior or which may operate directly with a conventional light source within the handgrip. For those cases where such an extremely advantageous universal utility is not required, embodiments are provided where operation can take place only with the light-conducting rod and an external source of light which delivers the light to the rod through a conductor in the form of a light-conducting cable. Of course, if desired, the light-conducting rod can coact with the internal light source which is situated directly within the handle.

The various requirements of the illuminating system of an ophthalmoscope, as set forth above, cannot all be satisfied simultaneously. It is therefore necessary to find a compromise between the different requirements, and it is necessary to find for the optical structure of the illuminating system a solution which achieves a compromise which will not necessarily provide the best possible operation of the device under a particular set of conditions. Extensive testing and investigation has indicated that an optical illuminating system for an ophthalmoscope, according to the following data, may be considered as the best possible solution. The diameter of the light-receiving end 9 of the light-conducting rod should have a size on the order of approximately 4 mm. In a corresponding manner the bundle of filaments which form the light-conducting cable should have the same or a slightly greater diameter. It has proved to be particularly advantageous to form the light-discharge end of the light-conducting rod as a rectangle the longer sides of which are parallel to the upper edge of the reflector 2. The size of the light-discharge surface should be approximately 0.3 ×0.6 mm taking into consideration manufacturing possibilities and the optical data of the remaining parts. The distance between the light-discharge surface 7 of the light-conducting rod 8 from the first surface of the condenser 6 should be on the order of 3.9 mm, and this same distance will be provided between this first surface of the condenser 6 and the lamp filament 27 in the case of illumination of the ophthalmoscope in a conventional manner. The first condenser surface should have a radius of 6.9 mm, while the second condenser surface should have a radius of 4 mm. The distance between the illuminating objective 3 and the illuminating field aperture 5 should be on the order of 19.5 mm, in the case where the radius of the first surface of the objective 3 is infinite and the radius of the second surface is 10.8 mm. In a case where an additional lens is situated in advance of the objective 3 in order to reduce the focal length of the objective, then the first surface of such an additional lens 4 should also have a radius of infinity while the second surface should have a radius of 19.91 mm.

The illuminating system of ophthalmoscopes provided with the light-conducting rods of the invention which serve to change the cross section of the stream of light provide their best possible functioning with the various parts coacting in an optimum manner when the above dimensions are applied. Of course it is fully possible to achieve these outstanding results also by changing all of the above data while retaining the various dimensions in the same proportions to each other so that all of the dimensions are correspondingly reduced or enlarged.

I claim:

1. In an ophthalmoscope, reflector means for reflecting light which travels along an optical axis toward an eye which is to be observed, light-source means located along said optical axis for providing light which travels therealong to be reflected by said reflector means, said light-source means including an elongated light-conducting rod terminating in opposed ends one of which is a light-discharge end from which light travels along the optical axis to said reflector means and the other of which is a light-receiving end for receiving light which passes through said rod to said discharge end thereof, said light-receiving end of said rod having an area substantially greater than the area of said light-discharge end of said rod, a diaphragm situated along the optical axis between said rod and said reflector means, and objective means situated along said optical axis between said diaphragm and said reflector means for imaging said diaphragm at infinity when light travels along the optical axis from said discharge end of said rod to said reflector means.

2. The combination of claim 1 and wherein a lamp is located in the region of said light-receiving end of said rod directing to the latter light to be conducted there through to said light-discharge end thereof.

3. The combination of claim 1 and wherein an elongated light-conducting cable, for receiving light from an external source, terminates adjacent said light-receiving end of said rod for directing light to the latter.

4. The combination of claim 1 and wherein said light-receiving end of said rod is of a circular configuration while said light-discharge end thereof is of a rectangular configuration.

5. The combination of claim 1 and wherein said rod is composed of an inner core of an optically high-refractive characteristic and an outer casing surrounding said core and being of an optically low refractive characteristic.

6. The combination of claim 1 and wherein said rod is composed of an inner transparent body and an exterior layer of high light-reflecting property surrounding said transparent body between said ends of said rod.

7. The combination of claim 1 and wherein said rod is composed of a plurality of elongated light-conducting filaments joined to each other in side by side relation and extending between said ends of said rod.

8. The combination of claim 1 and wherein a means coacts with said light-receiving end of said rod for interchangeably situating in the region thereof either a light source in the form of a lamp or a light source in the form of a light-conducting cable.

9. The combination of claim 8 and wherein said means for interchangeably connecting said lamp or cable at the region of said lighttreceiving end of said rod also functions for selectively replacing the entire rod with a lamp for directing light along the optical axis to said reflector means.

10. The combination of claim 9 and wherein said means for interchangeably connecting said lamps or cable includes a handgrip and an elongated conductor extending therefrom for transmitting electrical current to the lamps when the latter are used.

11. The combination of claim 10 and wherein said handgrip and conductor can be replaced by a hollow handgrip for housing batteries which serve as a source of energy.

12. The combination of claim 1 and wherein said reflector means has an upper edge and said light-discharge end of said rod is of a rectangular configuration having a longer side which extends parallel to said edge of said reflector means.

13. The combination of claim 12 and wherein the light-receiving end of said rod is of a circular configuration, a condenser situated between said light-discharge end of said rod and said reflector means in the region of said rod, said condenser having a pair of opposed curved surfaces, an illuminating objective situated along the optical axis between said condenser between the latter and said objective means, said objective means having a pair of lens surfaces, and an additional lens situated in advance of said objective means between the latter and said aperture.

14. The combination of claim 13 and wherein said circular light-receiving end of said rod has a diameter of 4 mm, said rectangular light-discharge end has a dimension of 0.3 times 0.6 mm, and said light-discharge end being situated at a distance of 3.9 mm from the first surface of said condenser, said latter surface having a radius of 6.9 mm, and said condenser having at its second surface a radius of 4.0 mm, the distance between said objective means and said illuminating field aperture being 19.5 mm, the radius of the first surface of said objective means being infinite while the radius of the second surface thereof is 10.8 mm, the additional lens which is situated in advance of said objective means having a first surface of infinite radius and a second surface of 19.91 mm.